Jan. 11, 1938.                C. J. HOLSLAG                2,105,079
                           ARC WELDING SYSTEM
                          Filed Oct. 29, 1936
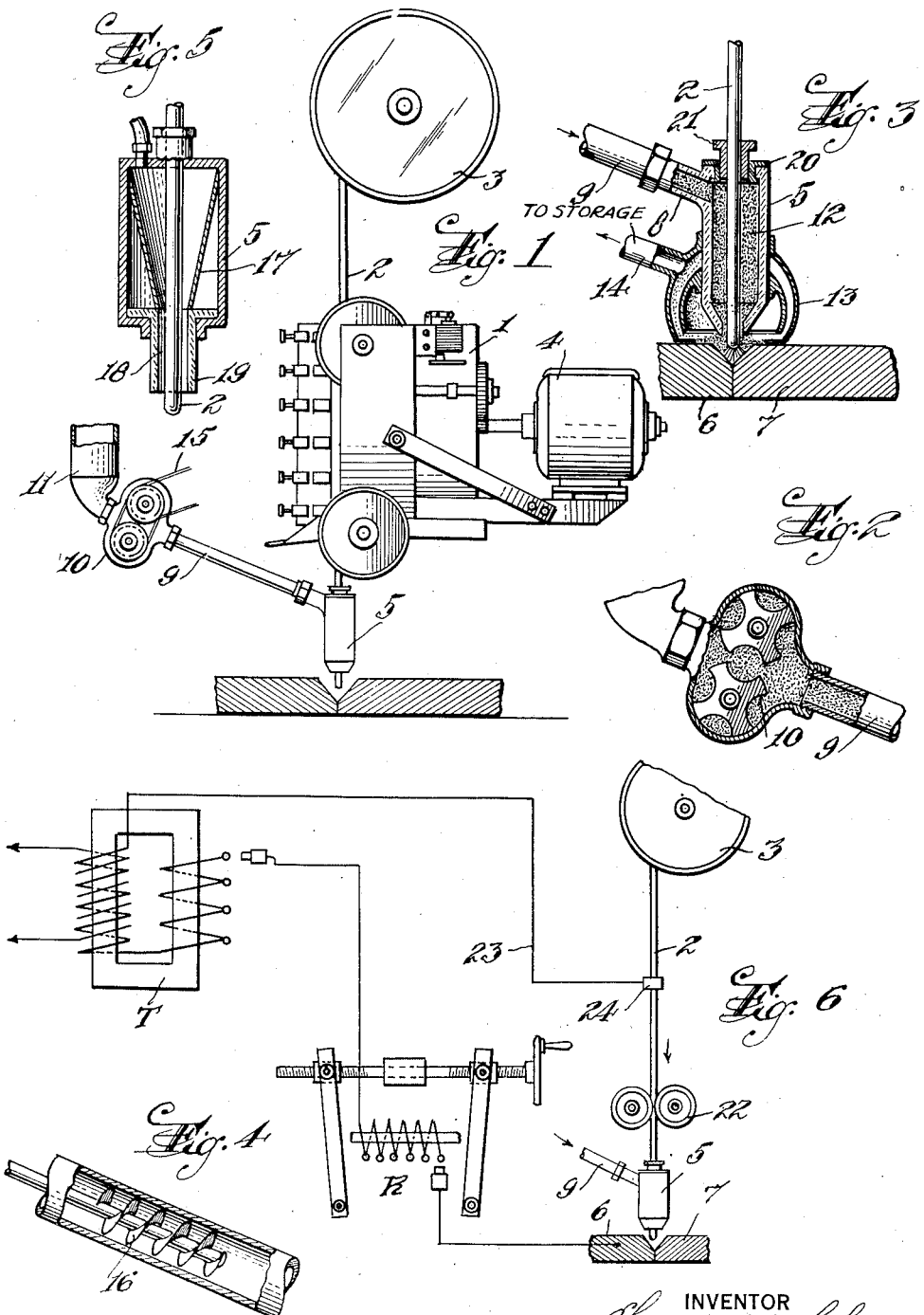
INVENTOR
Claude J. Holslag
BY
A. D. T. Libby
ATTORNEY Patented Jan. 11, 1938

2,105,079

UNITED STATES PATENT OFFICE 2,105,079

ARC WELDING SYSTEM

Claude J. Holslag, South Orange, N. J., assignor to Electric Arc Cutting & Welding Company, Newark, N. J.

Application October 29, 1936, Serial No. 108,131

2 Claims. (Cl. 219—8)

This invention relates to an arc welding system especially adapted for use in connection with automatic machine welding.

In metallic arc welding, better and stronger welds are made with a flux-coated electrode than can be obtained by using bare electrodes. In order to use a flux coating in connection with welding wire used in automatic machine arc welding, the flux must be added to the wire in such a way as to leave certain portions of the wire bare in order to secure contact with one side of the arc welding circuit. Various schemes have been proposed to allow the current to be passed to the welding wire. For example, it has been proposed to leave a part of the arcuate surface of the wire bare, or to provide grooves in the wire in which the flux is positioned, and various other schemes, including an arrangement for extruding a plastic flux coating over the wire as it passes through a chamber closely adjacent the welding arc.

All of these schemes have their objectionable features, as the specially constructed welding wire, carrying the flux, adds to the expense of the welding wire together with the trouble already expressed in making contact with the wire. The last-mentioned scheme has many objections because of the moisture tending to cool the arc, and even the water of crystallization in silicate of soda, which is frequently used in flux coatings, is harmful, if not allowed a long time in which to set. As the wire is consumed rather rapidly as it comes from the welding head of the automatic machine, no time is given the plastic coating to become dry, and being in a wet state, it is very apt to flake off and fall away entirely from the weld.

My present invention aims to overcome at least many of these objectionable features by using a bare wire to which electrical contact may be readily made, and to feed a dry or even superheated fluxing material to the immediate vicinity of the arc, and in such quantity as will thoroughly shield the arc and the molten metal produced by the arc.

Another object of my invention is to provide means for recovering the surplus flux which may not be consumed or utilized in the arc-welding operation.

Other objects will appear to one skilled in arc-welding from a reading of the specification, taken in connection with the annexed drawing, wherein:

Figure 1 is an elevational view of an automatic welding head showing, somewhat diagrammatically, the application of my improvement thereto.

Figure 2 is a fragmentary view, part in section, of one form of pump or feed means as shown in Figure 1.

Figure 3 is a view, part in section and part in elevation, of the flux-feeding chamber, together with a pickup for the excess flux.

Figure 4 shows a modified form of pump or flux-feeding device.

Figure 5 is a modified form of a flux-feeding device which may be used in place of that shown in Figure 3.

Figure 6 is a diagram showing my complete welding system utilizing alternating current.

In the various views, wherein like numbers refer to corresponding parts, 1 is an automatic welding head adapted to automatically feed welding wire 2 from a reel 3, the welding head being operated by a motor 4. Just below the head 1, there is a nozzle 5 through which the welding wire 2 passes into arc proximity to the workpieces 6 and 7 which are preferably grooved, or have their edges machined to form a groove prior to the welding operation. The nozzle 5 has an arm 8 to which is coupled a feed-pipe 9 connected to a pump or feed device 10. Joined to the pump 10, is a chamber or container 11 carrying a quantity of dry flux material which may be of any suitable composition or combination of ingredients to provide the desired characteristics at the arc and in the weld.

As shown in Figure 3, the flux material 12 is assisted downward by gravity and also by the movement of the welding wire 2 through the nozzle. The opening around the welding wire at the end of the nozzle is of course made or adjusted to pass a desired quantity of the dry flux around the arc so that it is completely shielded, an excess of the flux being preferably delivered, and this excess can be picked up by a hood-shaped device 13 spaced a considerable distance from the arc and carried back by pipe 14 to the container 11. This return of the flux 12 is brought about by a suction device connected to the pipe 14. The elements of the pump 10 may be driven in any satisfactory manner as by gearing, or a belt 15 as shown in Figure 1, from the motor 4 or other source of power.

An alternative form of pump is shown in Figure 4, in the shape of the worm 16. In any case, the feed of the flux 12 to the nozzle 5 is positive, although the flow may be regulated by the speed at which the pump is driven and by control at the nozzle 5, or a feed control may be used between the junction of the pump and the container 11.

In Figure 5, I have shown a modified form of nozzle 5, in which the interior is provided with a conical chamber 17 which will direct the flow of the flux 12 to the opening 18 around the welding wire 2. In Figure 5, the nozzle 5 is provided with a bushing 19, preferably of refractory material which will not be injured by the arc, whereas in Figure 3, the whole nozzle 5 is shown as being made of refractory material, the upper end of the nozzle being provided with metallic bushings 20 and 21 to guide the wire 2 through the nozzle. The matter of feeding the wire 2, starting the arc and controlling the flame thereof, is not involved in this present application.

In Figure 6, I have shown a welding circuit similar to that shown in my application S. N. 59,191, filed January 15, 1936, for a "Reactor", in which the transformer T supplies the welding current through a special type of reactor R to the welding electrodes, one of which is the bare wire 2 and the other the work-pieces 6 and 7, the wire being fed by the feed-rolls 22. It is to be understood that direct current may be used in the welding process instead of A. C. as indicated. As shown in Figure 6, the feed wire 23, coming from the transformer, is shown connected to a bushing 24 through which the electrode wire 2 runs, but it may be connected to the reel 3 and to other parts of the welding head 1, so that there is little or no loss in energy through the contact of the bare wire.

By feeding dry or heated flux to the arc, all danger of moisture gas pockets and other detrimental moisture effects is entirely overcome. Likewise, the plain bare wire direct from the drawing mill may be used for the purpose of machine welding, without any processing operations—and by processing I mean the application of fluxing material to the welding wire in some manner. Furthermore, the fluxing material can be mixed in a large mixing tank, or directly in the container 11, from the dry ingredients, and the percentages of these ingredients may be readily varied or changed to suit the welding conditions.

It is to be understood that the details for carrying my invention into practice, may be varied over rather wide limits, and I therefore do not wish to be unduly limited in the interpretation or the scope of the appended claims. For example, where I have indicated that the nozzle 5 or the bushing 19 is to be of high refractory material, this may be of any other suitable material which will withstand the temperature to which it may be subjected.

What I claim is:

1. An arc welding system using bare metallic wire throughout as one electrode, in conjunction with the work to be welded as the other electrode, and means for automatically feeding a dry flux in sufficient quantity around the arc to completely shield the arc and cover the molten metal produced by the arc, and automatic means for picking up any excess flux and returning it to storage.

2. In an automatic machine arc welding system, means for utilizing, to the greatest advantage, a bare metallic wire throughout as one electrode in conjunction with the work to be welded as the other electrode, and shielding the arc and molten metal produced by the arc, said means including dry fluxing material with devices for automatically feeding said fluxing material in surplus quantity over the arc and molten metal, and further means for taking away the excess flux.

CLAUDE J. HOLSLAG.